(12) United States Patent
Purtill

(10) Patent No.: US 11,980,917 B2
(45) Date of Patent: May 14, 2024

(54) SYSTEM AND METHOD FOR WASTE DISPOSAL

(71) Applicant: TRILOGY MEDWASTE, INC., Houston, TX (US)

(72) Inventor: Tyler Purtill, Largo, FL (US)

(73) Assignee: Trilogy Medwaste, Inc., Houston, TX (US)

( * ) Notice: Subject to any disclaimer, the term of this patent is extended or adjusted under 35 U.S.C. 154(b) by 0 days.

(21) Appl. No.: 17/718,939

(22) Filed: Apr. 12, 2022

(65) Prior Publication Data

US 2022/0331842 A1    Oct. 20, 2022

Related U.S. Application Data

(60) Provisional application No. 63/174,911, filed on Apr. 14, 2021.

(51) Int. Cl.
*B07C 5/34* (2006.01)
*B09B 3/00* (2022.01)
*B09B 101/65* (2022.01)

(52) U.S. Cl.
CPC .............. *B07C 5/3412* (2013.01); *B09B 3/00* (2013.01); *B07C 2501/0054* (2013.01); *B09B 2101/65* (2022.01)

(58) Field of Classification Search
CPC .................................................... B07C 5/3412
See application file for complete search history.

(56) References Cited

U.S. PATENT DOCUMENTS

| | | | |
|---|---|---|---|
| 2007/0278140 A1* | 12/2007 | Mallett | B07C 5/34 705/308 |
| 2019/0221306 A1* | 7/2019 | Kelkar | G16H 40/20 |
| 2019/0392403 A1* | 12/2019 | Rainaldi | G06Q 30/0215 |

* cited by examiner

*Primary Examiner* — Jacob S. Scott
*Assistant Examiner* — Miraj T. Patel
(74) *Attorney, Agent, or Firm* — Conley Rose, P.C.

(57) ABSTRACT

A system includes a network interface and a processor coupled to the network interface. The processor is configured to receive an identifier of a waste product via the network interface; determine, based on the identifier, a waste category for the waste product; and provide a report that includes the determined waste category.

18 Claims, 5 Drawing Sheets

SYSTEM AND METHOD FOR WASTE DISPOSAL

CROSS-REFERENCE TO RELATED APPLICATIONS

This application claims the benefit of U.S. Provisional Patent Application No. 63/174,911 filed on Apr. 14, 2021, which is incorporated herein in its entirety for all purposes.

BACKGROUND

Waste products include chemical products, biological products, pharmaceutical products, and the like. Handling such waste products can include tracking, storage, dispensing, and disposing of the product. This is generally referred to as waste disposal, which is a process that is often subject to various regulations, including federal-level regulations, state-level regulations, and/or enterprise-level regulations (e.g., policies and procedures).

SUMMARY

In an example of the present description, a system includes a network interface and a processor coupled to the network interface. The processor is configured to receive an identifier of a waste product via the network interface; determine, based on the identifier, a waste category for the waste product; and provide a report that includes the determined waste category.

In another example of the present description, a non-transitory machine-readable medium stores machine-readable instructions which, when executed by a processor, cause the processor to be configured to receive a domain identifier; provide a user interface based on the domain identifier; receive an identifier of a waste product; cause the user interface to display a list of products based on the identifier of the waste product; and provide a report based on a selection of a product of the list of products.

In yet another example of the present description, a method includes receiving, by a processor, an identifier of a waste product; determining, by the processor, a waste category for the waste product based on the identifier; and providing, by the processor, a report that includes the determined waste category.

BRIEF DESCRIPTION OF THE DRAWINGS

Various examples will be described below referring to the following figures.

DETAILED DESCRIPTION

Figure 1:
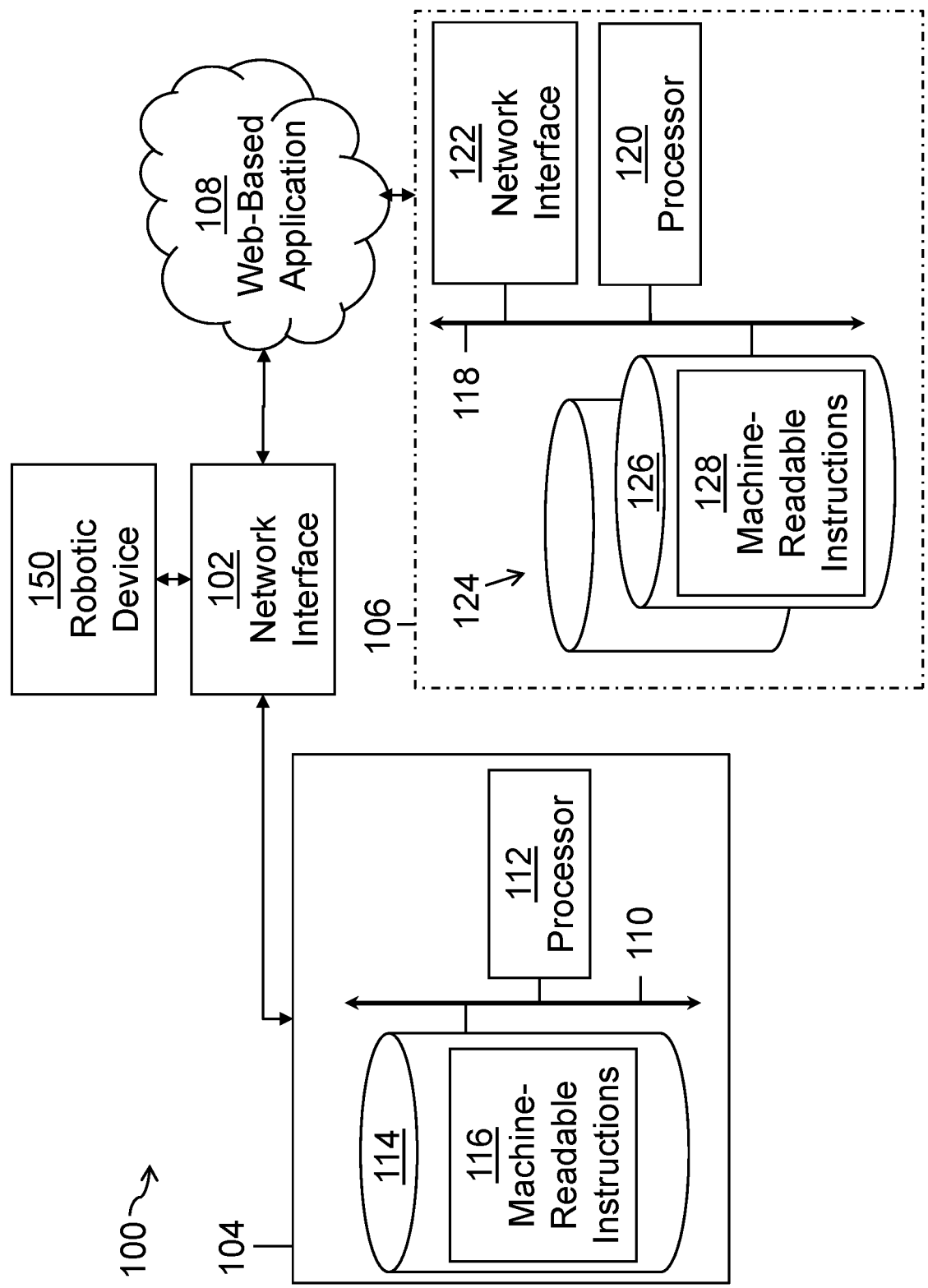
FIG. 1 is a schematic diagram of a system for waste disposal in accordance with various examples.

As explained above, the handling of waste products is a heavily-regulated activity. As one specific example, healthcare workers regularly handle many different pharmaceutical products (e.g., prescription and non-prescription medications). Healthcare workers are responsible for tracking, storage, dispensing, and disposal of the medications at all times. Tracking, storage, dispensing, and disposal of the medications are heavily-regulated activities. Healthcare workers are required to be current on all of the related regulations dealing with the handling of medications and are required to demonstrate compliance with the regulations.

In the specific example of pharmaceuticals, storage, dispensing, and disposal of prescription and non-prescription medications may be regulated at a state level as well as at a federal level. Multiple entities at each level may regulate various aspects of the handling. At the federal level, the Drug Enforcement Agency (DEA), Environmental Protection Agency (EPA), Department of Health and Human Services (HHS), Center for Disease Control (CDC), Occupational Safety and Health Administration (OSHA), and the Federal Drug Administration (FDA) are a few of the entities responsible for regulating how medications are handled, for example. At the state level, state health services agencies, state pharmacy boards, and state environmental agencies are a few types of entities responsible for regulating how medications are handled, for example. Enterprises (e.g., business entities) employing members of the healthcare industry may also have enterprise-level regulations (e.g., policies and/or procedures) for employees to follow when handling medications. Adding to the complexity of navigating the regulation system, a medication may be associated with multiple different names (e.g., brand names, generic names, dosage-related names, packaging-related names, manufacturer names).

Regardless of the type of waste product, various regulations may require an enterprise or entity (e.g., a company) to demonstrate an ability to make accurate determinations regarding proper waste disposal for a given product or group of products. Failing to comply with these regulations—or being unable to demonstrate such an ability to accurately determine how to properly dispose of waste product(s)—can result in large fines. In some cases, companies with large pharmaceutical divisions and/or retail pharmacies have incurred fines in excess of $10 million annually on average over a period of many years. Indeed, these costly fines are incurred despite robust internal attempts to comply with the regulations.

In an effort to comply with the various regulations, company employees may utilize a spreadsheet to determine how to handle a particular product. However, the spreadsheets become outdated as new medications/products are released into the market, old medications/products are removed from the market, and various regulations are modified, added, or removed. Additionally, spreadsheets are not able to provide notifications when updates occur, such as to underlying rules that govern handling of various medications/products. Spreadsheets also do not offer an adequate user interface for training purposes. Outdated spreadsheets, lack of notification regarding updates, and failing to provide training to members handling medications may each result in a failure to comply with the various regulations. As described above, compliance failures may result in expensive fines that can accumulate per occurrence, per day, per location.

In another effort to comply with the various regulations, a company may opt to "hard code" a particular handling protocol for a particular product. For example, an identification of the product is received, such as by scanning an identifier associated with the product, and associating the handling protocol with the identifier such that when the identification of the product is received, the handling protocol is presented to a user. However, such a hard-coded approach also becomes outdated as new medications/products are released into the market, old medications/products are removed from the market, and regulations(s) are modified, added, or removed. Further, maintaining such hard-coded relationships between products and handling instructions is tedious and inflexible, and does not facilitate various rules-based determinations to affect the handling protocol that is presented responsive to a particular product being identified.

Examples of this disclosure include systems and methods for tracking, storing, dispensing, and disposing of various waste products and/or medications to enable an employee (e.g., a healthcare worker), and thus enterprise, to maintain compliance with the various regulations. Tracking, storing, dispensing, and disposing of waste products, including medications, may be herein referred to collectively as handling of waste products. By utilizing the systems and methods described herein, entities are able to demonstrate compliance with various regulations by providing reports, may demonstrate proper handling of waste products and/or medications in accordance with each regulation by providing reports, and may facilitate the proper handling of waste products and/or medications by personnel by providing training and reports. By demonstrating compliance with regulations and proper handling of medications, the described examples may prevent entities from incurring expensive fines for compliance failure. These and other examples are described further below, with reference made to the accompanying figures.

FIG. 1 is a schematic diagram of a system 100 for waste disposal, such as determining disposal categorization of waste products and/or medications, in accordance with various examples. The system 100 comprises a network interface 102 coupled to a computing device 104 and a computing system 106. The network interface 102 may be an access point for accessing a network. The network interface 102 may connect to the network using a wired connection (e.g., Ethernet) or a wireless connection (e.g., BLUETOOTH®, WI-FI®). The network interface 102 may be a hub device, a switch device, a bridge device, a gateway device, a repeater device, a router device, a modem device, or any other suitable device for accessing a network (e.g., an access device), for example. The network interface 102 may also be configured to couple to a separate access device to access the network. The network may be a local area network (LAN), a wide area network (WAN) (e.g., the Internet), a virtual private network (VPN), an enterprise private network (EPN), or any other suitable system that connects computing devices for sharing data, for example. The computing device 104 may be a laptop, a notebook, a tablet, a smartphone, a mobile device, or some other electronic device with an ability to share data with a network. In some examples, the network interface 102 may be included in the computing device 104. The computing system 106 may be another computing device or may be a network of computing devices sharing memory and processing resources (e.g., the cloud). The computing system 106 may store the machine-readable instructions of a web-based application 108 that is accessible by the computing device 104 via the network interface 102.

The computing device 104 includes a communication bus 110 coupled to a processor 112 and a storage device 114. The communication bus 110 may be Inter-Integrated Circuit (I2C), Peripheral Component Interconnect Express (PCI-E®), or any other suitable bus that allows data transfers between components coupled to the communication bus 110, for example. The processor 112 may be a microprocessor, a microcomputer, a microcontroller, a programmable integrated circuit, a programmable gate array, or another suitable device for controlling operations of a component or multiple components, for example. The processor 112 may be a central processing unit (CPU), for example. The storage device 114 may include a hard drive, solid state drive (SSD), flash memory, electrically erasable programmable read-only memory (EEPROM), random access memory (RAM), or other suitable memory, for example. In some examples, the storage device 114 may store machine-readable instructions 116. The machine-readable instructions 116, when executed by the processor 112, may cause the processor 112 or the computing device 104 to perform some or all of the actions attributed herein to the processor 112 or the computing device 104, respectively.

The computing system 106 includes a communication bus 118 coupled to a processor 120, a network interface 122, and storage devices 124. The communication bus 118 may be any suitable bus that allows data transfers between components coupled to the communication bus 118, for example. The processor 120 may be a microprocessor, a microcomputer, a microcontroller, a programmable integrated circuit, a programmable gate array, or another suitable device for controlling operations of a component or multiple components, for example. The processor 120 may be local to a computing device comprising the storage devices 124 or may be on a remotely managed computing device (e.g., server, central server, edge server, or some other suitable computing device). The storage devices 124 may include hard drives, SSDs, flash memory, EEPROMs, RAMs, or other suitable memory, for example. In some examples, the storage devices 124 may be remotely-managed storage devices accessible via a network (e.g., enterprise cloud, public cloud, data center, server). In some examples, the storage device 126 of the storage devices 124 may store machine-readable instructions 128. The machine-readable instructions 128, when executed by the processor 120, may cause the processor 120 (or computing system 106) to perform some or all of the actions attributed herein to the processor 120 (or computing system 106).

As described above, the system 100 may be for tracking, storing, dispensing, and disposing of waste products and/or medications to enable an entity to maintain, demonstrate, or otherwise verify compliance with the various regulations. Further, the system 100 may also be configured to generate or provide one or more control signals to facilitate disposal of waste products and/or medications in accordance with a determined disposal protocol (e.g., determined by the system 100 as described herein). Still further, the system 100 may be configured to implement automated disposal of waste products and/or medications in accordance with the determined disposal protocol, such as by providing the control signals to a mechanized or robotic device 150. The robotic device 150 is configured to physically receive the waste products and/or medications and to provide the waste products and/or medications to an appropriate waste receptacle responsive to the control signal(s) provided by the system 100. In various examples, the waste receptacle(s) may be integrated to, or separate from, the robotic device 150. As shown in FIG. 1, the control signal(s) are provided by the computing device 104 to the robotic device 150 through the network interface 102. However, in other examples, the control signal(s) are provided by the computing device 104 to the robotic device 150 directly (e.g., via a wired connection, or by way of integrating the computing device 104 and the robotic device 105, such as in a common chassis or housing).

In some examples, the computing device 104 may access the web-based application 108 utilizing the network interface 102. In various examples, the web-based application 108 may include a user interface and data. The user interface enables a user to access and to interact with the web-based application 108. The user interface may be the user interface described below with respect to FIG. 2, for example. The data of the web-based application 108 may be stored as a data structure (e.g., object that stores and cross references data) on the storage devices 124, for example. The data structure may include a lookup table, a linked list, an array, a record, a database, or any other format that enables efficient access and management of data, for example.

The data may include a proprietary name (e.g., brand name, product name) of a waste product and/or medication, an identifier of the waste product and/or medication, a nonproprietary name (e.g., generic name) of the waste product and/or medication, a substance name of the waste product and/or medication, a product type of the waste product and/or medication (e.g., over-the-counter (OTC) drug, prescription drug, chemical waste, biological waste, and the like), a manufacturer of the waste product and/or medication, a patent number associated with the waste product and/or medication, a marketing date of the waste product and/or medication, a concentration value of the waste product (e.g., a dosage strength of a medication), a dosage form (e.g., a tablet, a capsule, a lotion, a cream, a gel, and the like) of the medication, a method by which the medication is administered (e.g., oral, intravenous), a storage method for the waste product and/or medication, a storage temperature for the waste product and/or medication, an expiration date of a patent associated with the waste product and/or medication, a cost of the waste product and/or medication (e.g., a wholesale or retail price), a waste category of the waste product and/or medication, a reason or rule for the waste category, a disposal method for the waste product and/or medication, a return method for the waste product and/or medication, an identifier of a governmental entity that regulates the waste product and/or medication, or any other related information for the waste product and/or medication, for example. The data may also include a user name, a password, a domain identifier, an enterprise identifier, a location identifier, or any other suitable identifying information for enabling access to the web-based application 108.

In some examples, a user may enter a user name and a password to access the web-based application 108. In response to the user name and the password, the web-based application 108 may provide a user interface, as described below with respect to FIG. 2. In response to the user name and the password, the web-based application 108 may limit the access of the user to a subset of data of the web-based application 108. The subset of data may herein be referred to as a profile. The profile may herein be referred to as associated with a domain. A single domain may have different profiles, each of which is said to be associated with that single domain, for example. Also, a single enterprise may have different domains, each of which is said to be associated with that single enterprise, for example. This enables an enterprise that owns or otherwise controls many different entities or sub-entities (e.g., a single corporate enterprise may own or control hospitals, clinics, nursing homes, and the like) to establish one or more different domains for each entity or sub-entity, for example. This also enables different locations of the enterprise to have different profiles, such as one profile associated with a particular location, for example. In some examples, a domain identifier is associated with a profile. The domain identifier may be based on the enterprise identifier, the location identifier, or some combination thereof, for example. In response to the user name and the password, the user may be able to access the profile for an enterprise, for example. In another example, in response to the user name and the password, the user may be able to access the profile for a location of the enterprise, for example.

In various examples, the web-based application 108 may be installed on the computing device 104. For example, the machine-readable instructions 116 may include machine-readable instructions that, when executed by the processor 112, provide a user interface that enables a user to access a profile of the web-based application 108. The user interface may be provided as described below with respect to FIG. 2, for example. In some examples, the profile of the web-based application 108 may be stored on the storage device 114. In other examples, the profile of the web-based application 108 may be stored on the storage devices 124.

In some examples, to populate the data of the web-based application 108, the processor 120 may retrieve information about the waste product and/or medication from the manufacturer or distributor. For example, the processor 120 may retrieve the information from a web site of the manufacturer or distributor. In another example, the processor 120 may retrieve the information from a prescribing information or a package insert provided by the manufacturer or distributor. In various examples, the processor 120 may retrieve the information from a website of a governmental entity that regulates the handling of waste products and/or medications. In other examples, the processor 120 may retrieve the information from a website of a governmental entity that approves applications based on the waste product and/or medication. For example, the processor 120 may retrieve information from a New Drug Application (NDA) submitted to the FDA, or from applications filed with the EPA, among other governmental entities. In another example, the processor 120 may retrieve information from a patent application submitted to the United States Patent and Trademark Office (USPTO). By retrieving the information about the waste product and/or medication from the relevant websites, the processor 120 enables the data structure to contain up-to-date information. In some examples, the processor 120 is configured to periodically (e.g., daily, weekly, bi-monthly, and the like) search for such information (e.g., via the web-based application 108 and/or the network interface 102) and update the data structure. In other examples, the processor 120 is configured to receive notifications (e.g., so-called "push" notifications) from such third-party websites and/or other sources, and to update the data structure responsive to receiving such a push notification.

Irrespective of how the data structure is updated, the processor 120 may be configured to determine a disposal categorization of a waste product and/or medication responsive to the information. For example, the processor 120 may utilize a neural network or machine learning to analyze the information and extract relevant data. The processor 120 may compare the relevant data to a disposal regulation of a regulatory agency to determine if the disposal regulation governs the waste product and/or medication. The processor 120 may repeat the comparison for each disposal regulation that may govern the handling of waste products and/or medications. Based on an identifier received by the processor 120, the processor 120 may provide a report on the disposal categorization of a waste product and/or medication associated with the identifier. The identifier may be an identifier assigned by a governmental entity. For example, the identifier may be a National Drug Code (NDC) labeler code assigned by the FDA. In another example, the identifier may be a Universal Product Code (UPC) assigned by the Global Standards Organization. In other examples, the identifier may be any suitable unique code.

In still further examples, the identifier may be an Active Pharmaceutical Ingredient (API) and/or an Inactive Pharmaceutical Ingredients (IPI). A single NDC code may have anywhere from 1-50 Active Pharmaceutical Ingredients. That same NDC code may also have anywhere from 1-100 Inactive Pharmaceutical Ingredients.

Figure 2:
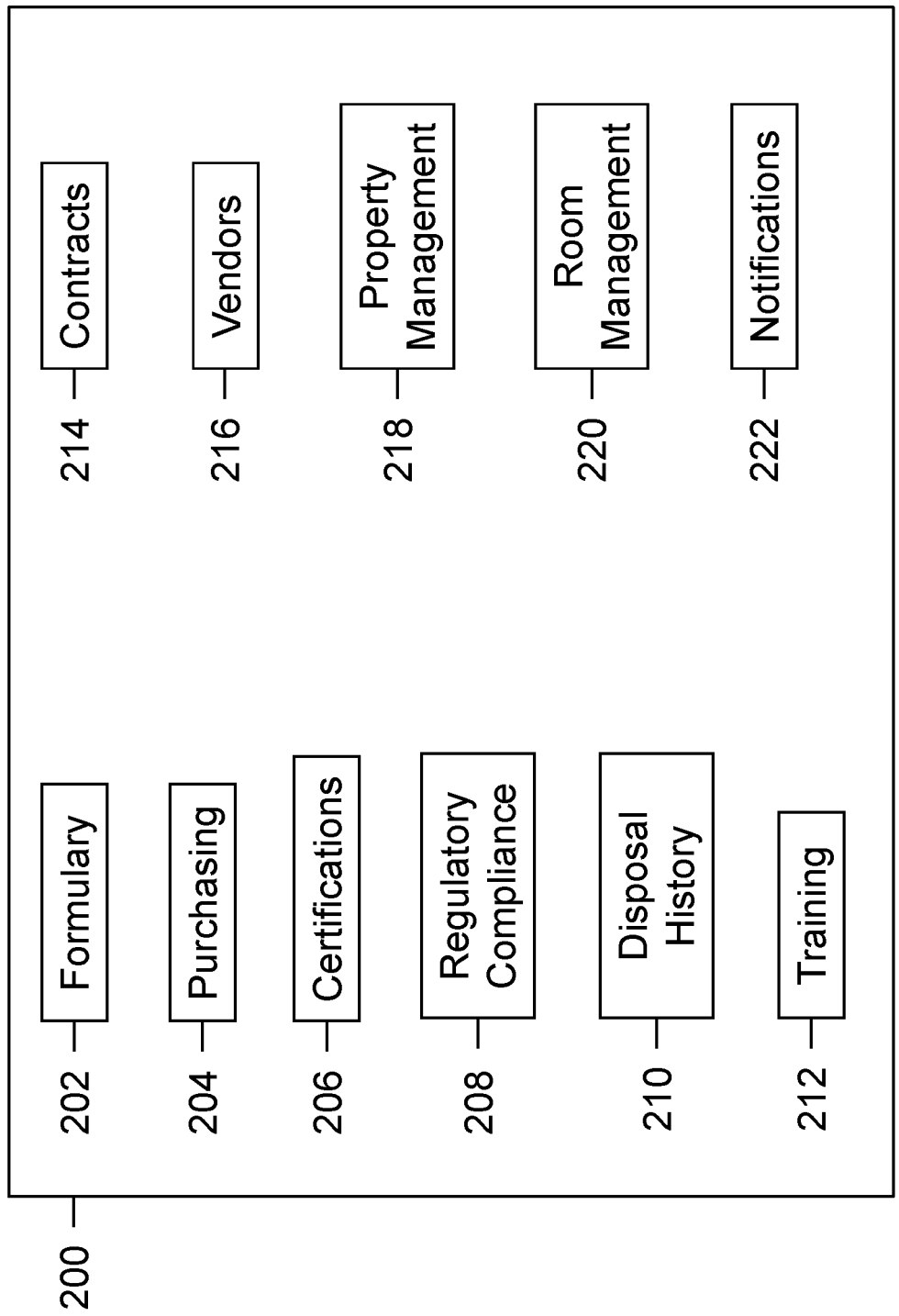
FIG. 2 is a schematic user interface for a system for waste disposal in accordance with various examples.

FIG. 2 is a schematic user interface 200 for a system for determining disposal categorization of waste products and/or medications, in accordance with various examples. The user interface 200 may be a user interface of the web-based application 108, for example. The system may be the computing system 106 hosting the web-based application 108, for example. The user interface 200 may include different icons with which a user may interact. Each icon may represent an application (e.g., machine-readable instructions for performing related operations on data). Each application may access a common data structure and may communicate with the other applications. For example, the user interface 200 may include icons for formulary 202, purchasing 204, certifications 206, regulatory compliance 208, disposal history 210, training 212, contracts 214, vendors 216, property management 218, room management 220, and notifications 222. Each icon may provide access to a different data of a profile, for example.

Formulary 202 may provide a list of waste products and/or medications, for example.

Purchasing 204 may provide a history of waste product and/or medication purchases or forecast future waste product and/or medication costs, for example.

Certifications 206 may provide a list of certifications held by an enterprise, a location of the enterprise, a user associated with the enterprise, a user associated with the location of the enterprise, or some combination thereof, for example. The certifications may include relevant permits, licenses, and authentication codes, for example.

Regulatory compliance 208 may provide a list of previous dates that regulatory compliance was demonstrated or may provide access to reports for demonstrating regulatory compliance, for example. For example, regulatory compliance 208 may enable the user to select a waste product and/or medication. In response to the selection, the web-based application 108 may retrieve a form from a governmental entity that regulates the waste product and/or medication and populate the form with information, for example. In particular, the regulatory compliance 208 may be useful to demonstrate compliance with various regulation(s), as described above.

Disposal history 210 may provide a list of previous dates on which a waste product and/or medication was disposed or a list of previous dates on which disposals of waste products and/or medications within a waste category were made, for example. In particular, the disposal history 210 may be useful to demonstrate compliance with various regulation(s), as described above.

Training 212 may provide access to coursework on proper disposal of waste products and/or medications, for example. The coursework may be based on an enterprise, a location of the enterprise, a user associated with the enterprise, a user associated with the location, or some combination thereof, for example. By providing access to training, the user interface 200 enables users of the web-based application 108 to maintain compliance by satisfying associated educational regulatory guidelines (e.g., continuing education (CE)).

Contracts 214 may provide a list of contracts of the enterprise, of a location of the enterprise, or some combination thereof, for example.

Vendors 216 may provide a list of vendors who provide supplies to the enterprise, the location of the enterprise, or some combination thereof, for example.

Property management 218 may provide a list of costs associated with a location of the enterprise. For example, property management 218 may provide a list of utility costs, rents, insurance rates, or some combination thereof.

Room management 220 may provide a list of rooms and a status for each room, for example.

Notifications 222 may provide a list of messages. The messages may include a safety alert for a waste product and/or medication, a recall notification for a waste product and/or medication, a market withdrawal notification for a waste product and/or medication, a re-order of supplies notification, an alternative waste product/medication availability notification, a patent expiration notification, a payment due notification, or some combination thereof. By providing notifications, the user interface 200 enables users of the web-based application 108 to maintain compliance with updated regulations. In other examples, the user interface 200 may include different icons for accessing applications that assist members of the healthcare or other industry in maintaining compliance with various regulations and in managing day-to-day operations.

As described above, the user interface 200 enables a user to access and to interact with data of the web-based application 108. In response to the user name and the password, the web-based application 108 may provide the user interface 200. For example, in response to the user name and the password indicating a domain associated with an enterprise, the web-based application 108 may provide the user interface 200 displaying icons associated with the enterprise. For example, the user interface 200 may display formulary 202, purchasing 204, regulatory compliance 208, disposal history 210, and notifications 222. In another example, the user name and the password may indicate a domain associated with another enterprise. The web-based application 108 may provide the user interface 200 displaying icons associated with another enterprise. For example, the user interface 200 may display formulary 202, purchasing 204, certifications 206, regulatory compliance 208, disposal history 210, training 212, and notifications 222.

Figure 3:
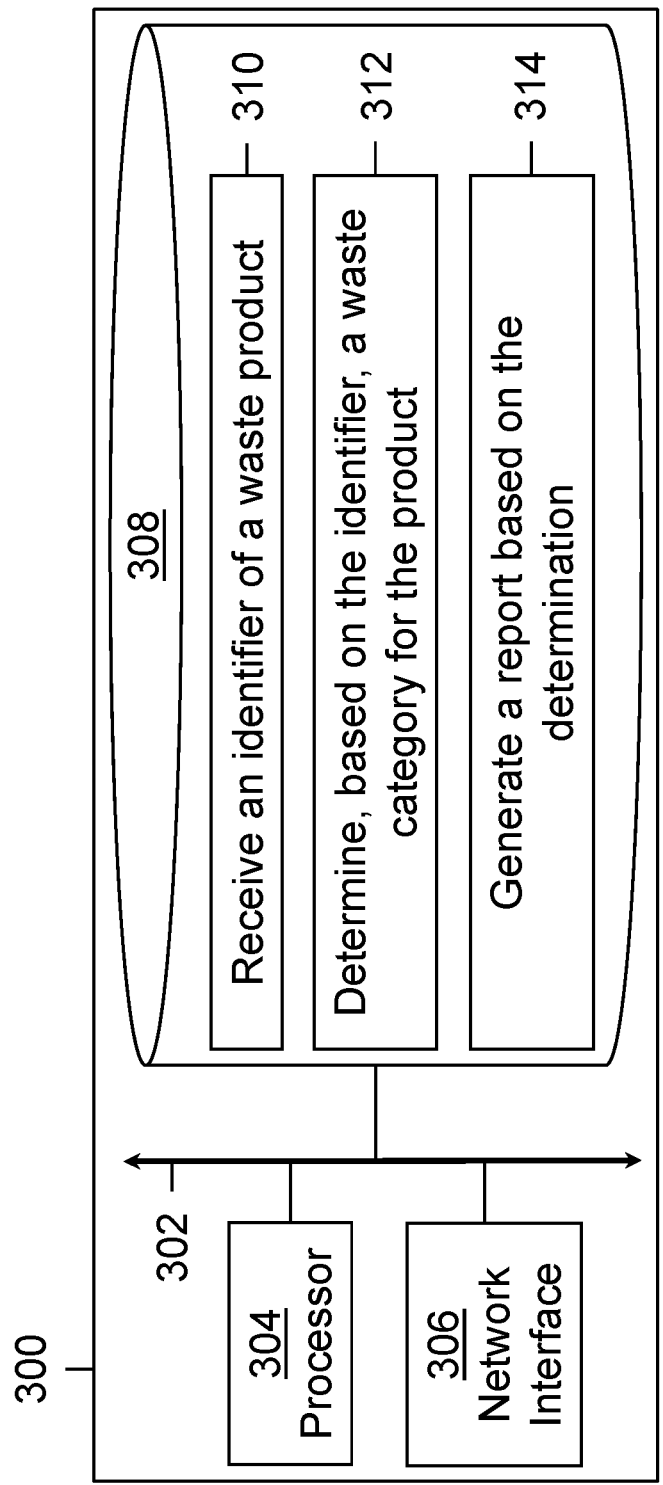
FIG. 3 is a schematic diagram of a computing device for waste disposal in accordance with various examples.

FIG. 3 depicts a schematic diagram of a computing device 300 for determining disposal categorization of waste products and/or medications, in accordance with various examples. The computing device 300 includes a communications bus 302 coupled to a processor 304, a network interface 306, and a storage device 308. The computing device 300 may be the computing device 104, or a computing device of the computing system 106, for example. The communication bus 302 may be any suitable bus that allows data transfers between components coupled to the communication bus 302, for example. The communication bus 302 may be the communication bus 118, for example. The processor 304 may be a microprocessor, a microcomputer, a microcontroller, a programmable integrated circuit, a programmable gate array, or another suitable device for controlling operations of a component or multiple components, for example. The processor 304 may be the processor 120, for example. The network interface 306 may be an access point for accessing a network. The network interface 306 may be the network interface 122, for example. The storage device 308 may include a hard drive, SSD, flash memory, EEPROM, RAM, or other suitable memory, for example. The storage device 308 may be the storage device 126, for example. In some examples, the storage device 308 may store machine-readable instructions 310, 312, and 314. The machine-readable instructions 310, 312, 314 may be the machine-readable instructions 128, for example. When executed by the processor 304, the machine-readable instructions 310, 312, 314 may cause the processor 304 to perform some or all of the actions attributed herein to the processor 304.

In examples, the machine-readable instructions 310, 312, 314 when executed by the processor 304, may cause the processor 304 to determine disposal categorization of waste products and/or medications. For example, execution of the machine-readable instruction 310 may cause the processor 304 to receive an identifier of a waste product and/or medication via the network interface 306. Execution of the machine-readable instruction 312 may cause the processor 304 to determine, based on the identifier, a waste category for the waste product and/or medication. The processor 304 may perform the method 500 described below with respect to FIG. 5 to determine the waste category, for example. Execution of the machine-readable instruction 314 may cause the processor 304 to provide a report based on the determination.

As described above with respect to FIG. 1, in response to a user name and a password, the processor 304 may provide a user interface that provides access to a profile of the web-based application 108 based on a domain or a location of the domain. In response to a user selecting a formulary icon (e.g., 202), the user interface may display a list of waste products and/or medications based on the profile. The list of waste products and/or medications may include an identifier, a product name, a substance name, a manufacturer, a waste category, a reason for the waste category, or a combination thereof for each product in the list of products, for example.

In various examples, the processor 304 may receive the identifier of the waste product and/or medication when a user selects a waste product and/or medication from the list of products. The list of products may be filtered by various criteria. For example, the list of products may be filtered by the identifier, the product name, or the substance name.

In some examples, the system 100 may include a peripheral device (not expressly shown) for scanning a bar code of a waste product and/or medication. The peripheral device may be a pen-type reader, a laser scanner, a light-emitting diode (LED) scanner, a mobile device camera (e.g., smartphone, laptop, notebook, tablet), or any other device capable of capturing an image of the bar code. The peripheral device may be coupled to the computing device 104 utilizing a wireless connection (e.g., BLUETOOTH, WI-FI) or a wired connection (e.g., universal serial bus (USB), Recommended Standard 232 (RS-232), Personal System/2 (PS/2)), for example. The bar code may be formatted in accordance with a one-dimensional (1D) linear code, a two-dimensional (2D) data matrix code, a uniform product code (UPC), a quick response (QR) code, a Datamatrix code, or any other suitable format for encoding information such as an identifier, a serial number, a lot number, an expiration date, or any other information for identifying and handling waste products and/or medications. A user may utilize the peripheral device to scan a bar code on a waste product and/or medication, for example. The processor 112 may cause the bar code to be transmitted to the web-based application 108 via the network interface 102. The processor 120 may receive the bar code. The processor 120 may decode the bar code format to receive the identifier.

As described above with respect to FIG. 1, in some examples, in response to a user name and a password, the processor 120 may provide a user interface that grants access to a profile of the web-based application 108 based on a domain or a location of the domain. In various examples, after receiving the identifier, the processor 120 may determine whether the identifier is an identifier associated with the domain. In response to a determination that the identifier is not associated with the domain, the processor 120 may update a profile of the domain by adding the identifier and associated data of the identifier to the profile. For example, if a generic version of a waste product and/or medication is released to the market, the enterprise associated with the domain may decide to utilize the generic in place of the brand name version of the waste product and/or medication. In response to receiving the NDC or other identifier associated with the generic version, the processor 120 may add the data associated with the generic version to the profile of the enterprise.

In various examples, the processor 304 may provide a report including the waste category associated with the identifier. The report may include the substance name, the dosage form, the consumption method, the dosage strength, the regulatory return policy, the regulatory return policy details, a method of disposal, disposal instructions, a waste category, a reason for the waste category, and/or an indicator of which governmental entity regulates the medication, for example. In another example, the report may be customized to comply with state or entity regulations.

For example, the processor 304 may be configured to receive an indication of its geographic location (e.g., from an external source, or from an internal Global Positioning System (GPS) device). In this example, the processor 304 is configured to provide a first report responsive to the identifier and an indication of its geographic location being a first geographic location. The processor 304 is also configured to provide a second report, different than the first report, responsive to the same identifier and an indication of its geographic location being a second geographic location. In this way, the processor 304 is configured to tailor the provided report to particular geographic location(s) in which the identifier is acquired, enabling location-specific rules to be considered. For example, a first state may require a first method of disposal for a given waste product and/or medication, while a second state may require a second method of disposal for the same waste product and/or medication. Unlike a system that utilizes mistake-prone spreadsheet lookup, or an inflexible hard-coding between an identifier and waste categorization, the system 300 thus enables accurate and flexible handling of waste products and/or medications in geographically disparate locations, having disparate rules for handling of such products.

In other examples, the report may include product characteristics, information on the vendor, another method of disposal, or any other relevant information.

In some examples, the processor 304 may provide another report based on the identifier. For example, the user may select a purchasing icon (e.g., 204). In response to the selection, the processor 304 may provide a report that includes a date of availability of a waste product and/or medication associated with the identifier, a price of the waste product and/or medication, any available alternate waste products and/or medications, a price of each available alternate waste product and/or medication, or a combination thereof. In another example, the user may select a notification icon (e.g., 222). In response to the selection, the processor 304 may provide a report that includes a safety alert issued for the waste product and/or medication associated with the identifier, a recall notification for the waste product and/or medication, a market withdrawal notification for the waste product and/or medication, or some combination thereof.

In other examples, the processor 304 may retrieve a form associated with a regulatory entity and populate the form with information. For example, the user may select a regulatory compliance icon (e.g., 208) to complete a form for returning a waste product and/or medication associated with the identifier. In response to the selection, the processor 304 may retrieve the form from the appropriate regulatory entity. Utilizing data stored on the storage device 308, the processor 304 may fill out the form. The processor 304 may cause the user interface to display the form to a user for verification. In response to a user verification of the form, the processor 304 may submit the form via the network interface 306, for example. In another example, in response to the user verification, the processor 304 may cause the form to be printed by a peripheral device (not expressly shown) coupled to the computing device 300.

Figure 4:
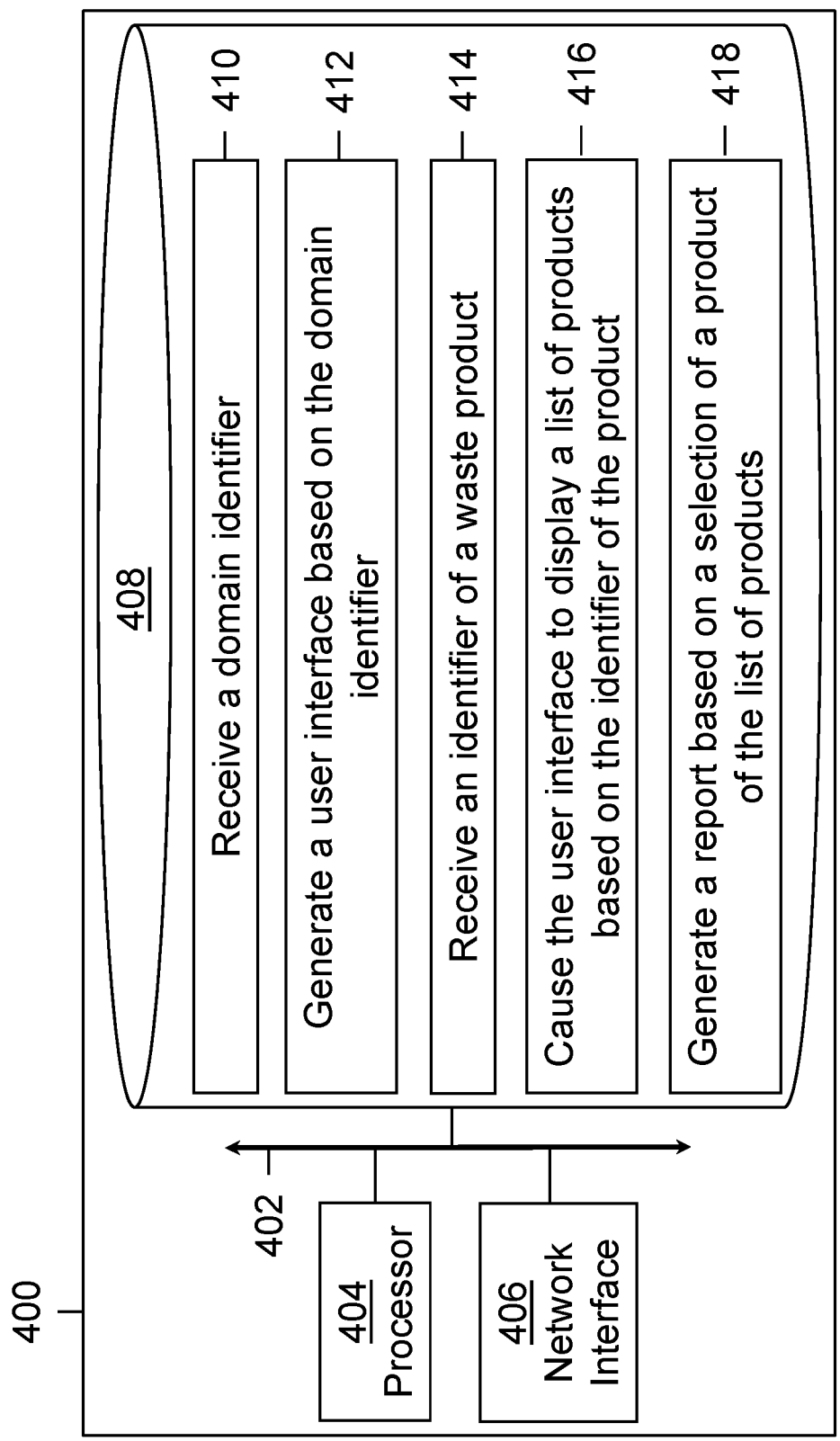
FIG. 4 is a schematic diagram of a computing device for waste disposal in accordance with various examples.

FIG. 4 depicts a schematic diagram of a computing device 400 for determining disposal categorization of waste products and/or medications, in accordance with various examples. The computing device 400 includes a communications bus 402 coupled to a processor 404, a network interface 406, and a non-transitory storage medium 408. The computing device 400 may be the computing device 104, or a computing device of the computing system 106, for example. The communication bus 402 may be any suitable bus that allows data transfers between components coupled to the communication bus 402, for example. The communication bus 402 may be the communication bus 118, for example. The processor 404 may be a microprocessor, a microcomputer, a microcontroller, a programmable integrated circuit, a programmable gate array, or another suitable device for controlling operations of a component or multiple components, for example. The processor 404 may be the processor 120, for example. The network interface 406 may be an access point for accessing a network. The network interface 406 may be the network interface 122, for example. The non-transitory storage medium 408 may include any electronic, magnetic, optical, or other physical storage device for storing information such as computer-readable instructions and data. The non-transitory storage medium 408 may be the storage device 126, for example. In some examples, the non-transitory storage medium 408 may store machine-readable instructions 410, 412, 414, 416, and 418. The machine-readable instructions 410, 412, 414, 416, 418 may be the machine-readable instructions 128, for example. When executed by the processor 404, the machine-readable instructions 410, 412, 414, 416, 418 may cause the processor 404 to perform some or all of the actions attributed herein to the processor 404.

In some examples, the machine-readable instructions 410, 412, 414, 416, 418 when executed by the processor 404, may cause the processor 404 to determine disposal categorization of waste products and/or medications. For example, execution of the machine-readable instruction 410 may cause the processor 404 to receive a domain identifier. The domain identifier may be the enterprise identifier, the location identifier, or some combination thereof, for example. The domain identifier may be herein referred to as a first domain identifier. Execution of the machine-readable instruction 412 may cause the processor 404 to provide a user interface based on the identifier. The processor 404 may provide the user interface as described above with respect to FIGS. 2 and 3, or example. The user interface may be the user interface 200, for example. Execution of the machine-readable instruction 414 may cause the processor 404 to cause the user interface to display a list of products (e.g., waste products and/or medications) based on the identifier. Execution of the machine-readable instruction 416 may cause the processor 404 to provide a report based on a selection of a product from the list of products.

As described above with respect to FIG. 3, a domain may have a profile that includes a list of products (e.g., waste products and/or medications). In some examples, the processor 404 may receive the domain identifier and retrieve the profile indicated by the domain identifier. The processor 404 may provide the user interface based on the profile. For example, the processor 404 may provide a user interface having icons to access applications available to the profile. In another example, the processor 404 may provide a user interface having a list of products of the profile. In various examples, the processor 404 may receive an identifier of a waste product and/or medication that is a partial identifier. The processor 404 may cause the user interface to display a list of products that includes the waste products and/or medications having identifiers that include the partial identifier. In response to a user selecting a waste product and/or medication from the list of products, the processor 404 may provide a report based on the selection.

In some examples, the user interface includes criteria by which the user may filter the list of products (e.g., waste products and/or medications). For example, the user interface may allow the user to filter the list of products by manufacturer, waste category, a substance name, a product type, a dosage strength, a dosage form, a method by which the product is administered, a storage method, a reason for the waste category, a disposal method, a return method, an indicator for a governmental entity that regulates the product, or any other related information for the product, for example. In response to the selected filter, the processor 404 may cause the user interface to display a second list of products that satisfy the specified criteria. The user interface may allow the user to filter the second list using a different set of criteria. For example, the user interface may allow the user to perform a second filter the second list of products by an unselected previous criteria or by additional criteria such as storage temperature, patent expiration date, marketing date, or any other data field associated with an identifier. The processor 404 may provide a report based on the second filter selected from the user interface. In various examples, the report may be in a tabular format. In other examples, the report may be in a chart format (e.g., pie chart, line chart, etc.).

In various examples, the processor 404 may receive another domain identifier. The processor 404 may provide another user interface based on another domain identifier. The processor 404 may receive another identifier of a waste product and/or medication. The processor 404 may cause another user interface to display another list of products (e.g., waste products and/or medications) based on another domain identifier. The processor 404 may provide another report based on a selection of a product from another list of products. In some examples, the first domain identifier and another domain identifier may be associated with an enterprise. The first domain identifier may be associated with a first location of the enterprise and another domain identifier may be associated with another location of the enterprise. In other examples, another domain identifier may be associated with another enterprise that is different from the enterprise associated with the first domain identifier.

Figure 5:
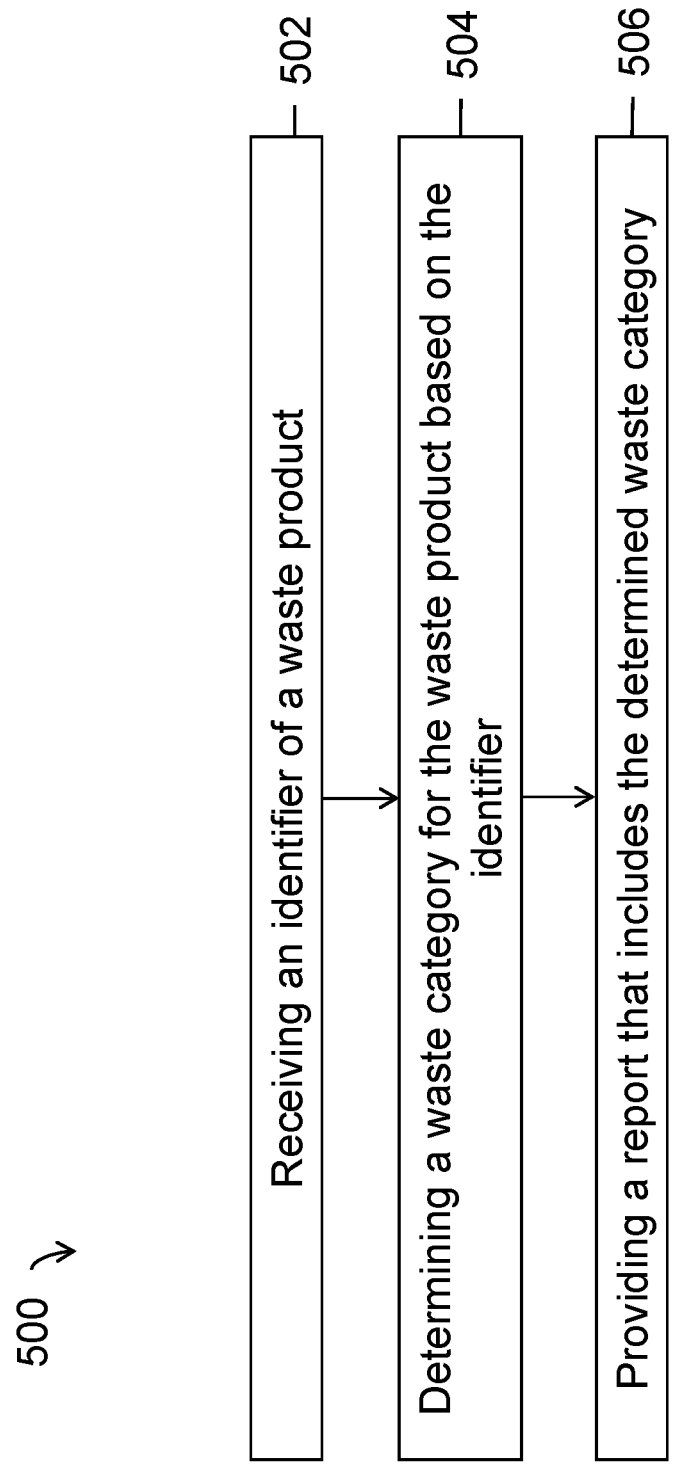
FIG. 5 is a flow diagram of a method for waste disposal in accordance with various examples.

FIG. 5 depicts a flow diagram of a method 500 for determining disposal categorization of waste products and/or medications in accordance with various examples. The method 500 includes receiving an identifier of a waste product, such as a medication or other product to be disposed of (block 502). In some examples, block 502 is performed by a processor, such as a processor of the computing devices 104, 300, 400 or the computing system 106. The method 500 also includes determining a waste category for the waste product based on the received identifier (block 504). Block 504 may also be performed by the processor indicated above. In some examples, the determined waste category is based at least in part on a disposal regulation, which may govern a medication, an aerosol, an acid, an oxidizer, a best practice, a radioactive material, a non-hazardous material, or a combination thereof, for example. In other examples, the disposal regulation may be based on a guideline of a governmental entity. For example, the disposal regulation may be based on a DEA schedule or an EPA hazardous waste guideline. The method 500 further includes providing a report that includes the determined waste category (block 506). Block 506 may be performed by the processor indicated above.

In various examples, the method 500 may be performed by the processor 112, 120, 304, or 404. For example, the processor 112, 120, 304, 404 may receive an identifier of a waste product. In some cases, the processor 112, 120, 304, 404 may retrieve additional data based on the identifier. The processor 112, 120, 304, 404 may categorize the waste product (e.g., determine a waste category for the waste product) based on the identifier, and in some cases additionally based on a disposal regulation. The processor 112, 120, 304, 404 may provide a report including the determined waste category.

In some examples, the processor 112, 120, 304, 404 may receive a second disposal regulation. The second disposal regulation may govern a different form than a first disposal regulation. For example, the first disposal regulation may regulate disposal of an acid while the second disposal regulation may regulate a disposal best practice, such as disposal of a syringe in a sharps container, disposing of a chemotherapy product in a container destined for incineration, or an instruction to "return to pharmacy" for a DEA controlled substance so that the pharmacy is enabled to inventory a remaining quantity of the medication. In another example, the first disposal regulation may be based on a DEA schedule and the second disposal regulation may be based on an EPA hazardous waste guideline. The processor 112, 120, 304, 404 may categorize the medication based on the data and the second disposal regulation. The processor 112, 120, 304, 404 may provide a second report of the categorization.

In further examples, the method 500 includes (and/or the processor is configured to) evaluating the ingredients of a medication (e.g., both active (API) and inactive (IPI)) for various NDC codes to be configured to determine proper handling, storage, and disposal for the given medication. Thus, for example, a medication may have the same name, the same dosage form (e.g., injection), the same manufacturer (e.g., Pfizer), the same strength (e.g., 5 mg/mL), but can still be regulated differently based on the components of the API and IPI. Further, depending on the geographic location (e.g., state) in which the method is conducted (e.g., in which the product is scanned, or the identifier is acquired), the medication may be regulated differently yet again. In this manner, the processor and method are able to evaluate each NDC code by evaluating the entirety of all of the ingredients of the medication. Any single ingredient in the waste product and/or medication present a decision to be made regarding handling the product. Accordingly, a medication with one API and 15 IPI's could result in 16 such decisions to be made. Further, each of those 16 decisions may be compared against numerous regulatory requirements, which are subject to change over time, in some cases at multiple levels (e.g., federal, state, and local). Still further, manufacturers from time to time will reformulate the ingredients in a medication or waste product, which results in a need to be reevaluated to determine a proper handling protocol. Further still, some medications or waste products called by the same name are made in different dosage forms which can change their regulatory status.

In a particular example, testosterone is made as a tablet, a gel, and an injection. In all cases, testosterone is a Schedule 3 controlled substance regulated by the DEA. But some of the gel and injection dosage forms contain alcohol as an ingredient. If the alcohol content is high enough (e.g., greater than 24%), that medication may also meet the EPA's criteria for being flammable. Accordingly, the product would be both a DEA Controlled Substance as well as an EPA RCRA (D001) for ignitability if it contains greater than 24% alcohol.

In another example, Gabapentin is a non-hazardous medication at the federal level but, because this product has shown it can be abused in the marketplace, Gabapentin is a Schedule 5 DEA Controlled Substance at the state level in Kentucky.

To address the complexity in handling such products, the described systems, processors, and/or methods do not necessarily only evaluate the ingredients of each waste product and/or medication to identify a match to a single regulatory requirement. Rather, the systems and methods described herein identify all matches (e.g., a plurality of matches in some cases) against regulatory requirements, because the product in question (e.g., the product that is scanned and/or has its identifier acquired) may satisfy more than one criterion for more than one regulatory agency. Further, regulations may change from time to time, which is addressed by the systems and methods described herein that reevaluate (e.g., periodically) new regulatory requirements, such as from third-party sources (e.g., websites, publications, push notifications, and the like). In some examples, the systems and methods described herein reevaluate regulatory requirements for multiple waste products and/or medications. Further, in some examples, the systems and methods described herein reevaluate regulatory requirements at both the federal and state level.

In various examples, the processor 112, 120, 304, 404 may receive a domain identifier. The processor 112, 120, 304, 404 may provide a report comprising a list of medications and associated data for the identifier. In some examples, the processor 112, 120, 304, 404 may receive an identifier of a second domain. The processor 112, 120, 304, 404 may provide a second report comprising a list of medications and associated data for the identifier. In some examples, the report is different from the second report.

In certain examples of the disclosed embodiments, the system has not only the ability to track users at a specific location (e.g., Hospital A), but based on the floor number and department the user works in (e.g., from data the user enters into their user profile), the system can track medications down to the department they are used in (i.e., where they are scanned) and also down to the individual user level. Such functionality is geared towards theft protection and medication (DEA) diversion. Thus, for example, a hospital would have data on which employee has scanned which medication, how many times, and what department they work in. If an employee working in dialysis scans a DEA Controlled Substance, the system can notify their administrator that such action needs investigating because dialysis does not use Controlled Substances. The objective is to stop opioids and other high value medications from being stolen or sold illicitly. In this manner, the system can track this through user login credentials or badge scans in real time, with alerts and notifications.

As discussed above with respect to FIG. 1, in various examples, the web-based application 108 may include a user interface and data. In some examples, the method 500 may be performed on each identifier of a medication of the data for the web-based application 108 to determine a waste category of each medication. The method 500 may include receiving identifiers from a file that is provided by a user. For example, an enterprise may provide a list of identifiers that is used at a location of the enterprise. The method 500 may include providing a report that includes a list of each waste category, a number of medications within each waste category, a percentage of medications within each waste category, a number of medications for review, or some combination thereof. The method 500 may determine the number of medications for review after determining the presence of duplicated identifiers or identifiers having insufficient data, for example As discussed above with respect to FIG. 2, the user interface of the web-based application 108 may include different icons for accessing applications that assist members of the healthcare industry in maintaining compliance with various regulations and in managing day-to-day operations. In some examples, the method 500 may include aggregating, by the processor, data from profiles of different enterprises or different locations of enterprises to determine operation metrics. The method 500 may also include aggregating data to maintain the privacy of enterprises by removing, by the processor, identifiers from the aggregated data. The operation metrics may include purchasing histories, purchasing forecasts, disposal histories, disposal forecasts, rent costs, utility costs, and property management costs, for example. Additionally, the method 500 may include aggregating, by the processor, data based on a geographical location (e.g., city, county, state, region) associated with the profiles, a type of enterprise associated with the profiles (e.g., hospices, hospitals, emergency clinics, doctor offices), or some combination thereof, for example. The method 500 may include providing a report on the operation metrics. For example, the report may display a chart of medication costs for each location of an enterprise. In another example, the report may display a chart of medications costs for enterprises located within a county. In another example, the report may compare a rent of an enterprise with an average rent for similar enterprises located in the same city. In another example, the report may display a forecast of medication costs for each location of an enterprise based on a market availability date for a generic of the medication.

By utilizing the system described herein, members of the healthcare industry may demonstrate compliance with various regulations. Reports provided by the system demonstrate proper handling of medications in accordance with each regulation and facilitate the proper handling of medications by personnel. Additionally, by utilizing the system described herein, members of the healthcare industry may provide training to personnel and manage day-to-day operations.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the above discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. As used herein, including in the claims, the word "or" is used in an inclusive manner. For example, "A or B" means any of the following: "A" alone, "B" alone, or both "A" and "B." In addition, when used herein including the claims, the word "generally" or "substantially" means within a range of plus or minus 10% of the stated value.

What is claimed is:

1. A system, comprising:
a network interface; and
a processor coupled to the network interface, wherein the processor is configured to:
  receive an identifier of a waste product via the network interface;
  receive an indication of a geographic location of the system;
  determine, based on the identifier and the geographic location, a waste category for the waste product;
  provide a report that includes the determined waste category; and
  provide a control signal to facilitate disposal of the waste product in accordance with a disposal protocol responsive to the determined waste category, wherein the control signal implements a first disposal protocol when the geographic location is a first geographic location, and implements a second disposal protocol when the geographic location is a second geographic location different than the first geographic location, and
wherein the first disposal protocol is different than the second disposal protocol.

2. The system of claim 1, wherein the identifier is in a bar code format and wherein the processor is configured to decode the bar code format to receive the identifier.

3. The system of claim 1, wherein the processor is configured to:
determine whether the identifier is an identifier associated with a domain; and
update, based on the determination, a profile of the domain.

4. The system of claim 1, wherein the report comprises one or more selected from a group consisting of: a name, a dosage strength, a dosage form, a consumption method, a return method, a disposal method, the waste category, and an agency regulating the medication.

5. The system of claim 1, wherein the report is a first report, and wherein the processor is configured to provide a second report based on the identifier.

6. The system of claim 5, wherein the second report comprises one or more selected from a group consisting of: a safety alert, a recall notification, a market withdrawal notification, or some combination thereof.

7. The system of claim 1, wherein the processor is configured to:
receive a form associated with a regulatory entity; and
populate the form with information stored on the storage device.

8. The system of claim 1, wherein the report is a first report, and wherein the processor is configured to:
provide the first report responsive to the identifier and the geographic location being the first geographic location; and
provide a second report responsive to the identifier and the geographic location being the second geographic location, wherein the second report is different than the first report.

9. The system of claim 8, wherein the first report includes the first disposal protocol for the waste product, and wherein the second report includes the second disposal protocol for the waste product.

10. The system of claim 1, further comprising a robotic device coupled to the processor, wherein the robotic device is configured to:
receive the control signal from the processor;
physically receive the waste product; and
provide the received waste product to a waste receptacle responsive to the control signal.

11. A non-transitory, machine-readable medium storing machine-readable instructions that, when executed by a processor, cause the processor to:
provide a user interface based on the domain identifier;
receive an identifier of a waste product;
receive a domain identifier associated with a geographic location of the waste product;
cause the user interface to display a list of products based on the identifier of the waste product;
provide a report based on a selection of a product of the list of products;
determine, based on the identifier and the geographic location, a waste category for the waste product; and
provide a control signal to facilitate disposal of the waste product in accordance with a disposal protocol responsive to the determined waste category,
wherein the control signal implements a first disposal protocol when the geographic location is a first geographic location, and implements a second disposal protocol when the geographic location is a second geographic location different than the first geographic location, and
wherein the first disposal protocol is different than the second disposal protocol.

12. The machine-readable medium of claim 11, wherein execution of the machine-readable instructions causes the processor to:
cause the user interface to display a second list of products based on a filter selected from the user interface; and
provide a second report based on a second filter selected from the user interface.

13. The machine-readable medium of claim 11, wherein the domain identifier is a first domain identifier, and wherein execution of the machine-readable instructions causes the processor to:
receive a second domain identifier;
provide a second user interface based on the second domain identifier;
receive a second identifier of a waste product;
cause the second user interface to display a second list of products based on the second identifier; and
provide a second report based on a selection of a product from the second list of products.

14. The machine-readable medium of claim 13, wherein the first domain identifier is associated with a first location of the domain and the second domain identifier is associated with a second location of the domain.

15. The machine-readable medium 13, wherein a first enterprise associated with the first domain identifier is different from a second enterprise associated with the second domain identifier.

16. A method, comprising:
receiving, by a processor, an identifier of a waste product;
receiving, by the processor, an indication of a geographic location of the processor;
determining, by the processor, a waste category for the waste product based on the identifier and the geographic location; and
providing, by the processor, a report that includes the determined waste category; and
providing, by the processor, a control signal to facilitate disposal of the waste product in accordance with a disposal protocol responsive to the determined waste category,
wherein the control signal implements a first disposal protocol when the geographic location is a first geographic location, and implements a second disposal protocol when the geographic location is a second geographic location different than the first geographic location, and
wherein the first disposal protocol is different than the second disposal protocol.

17. The method of claim 16, wherein the report is a first report, and wherein the method further comprises:
providing the first report responsive to the identifier and the geographic location being the first geographic location; and
providing a second report responsive to the identifier and the geographic location being a the second geographic location, wherein the second report is different than the first report.

18. The method of claim 17, wherein the first report includes the first disposal protocol for the waste product, and wherein the second report includes the second disposal protocol for the waste product.

* * * * *